United States Patent [19]
Lankenau et al.

[11] 3,913,890
[45] Oct. 21, 1975

[54] RELATIVELY HARD UNATTACHED OBJECTS TO INHIBIT CAKING AND SCALING IN A HORIZONTAL PIPELINE

[76] Inventors: Arthur W. Lankenau, 12282 W. Dakota Drive, Lakewood, Colo. 80228; Harry B. Scott, 350 Gregory Drive, Golden, Colo. 80401

[22] Filed: Mar. 2, 1973

[21] Appl. No.: 337,287

[52] U.S. Cl. .................... 259/3; 259/14; 259/30; 259/81 R; 259/89; 261/92
[51] Int. Cl.² ...................... B01F 9/06; B01F 15/02
[58] Field of Search ........... 259/3, 14, 30, 57, 81 R, 259/89, 90; 261/92

[56] References Cited
UNITED STATES PATENTS

| | | | |
|---|---|---|---|
| 2,872,386 | 2/1959 | Aspegren | 259/3 |
| 2,960,778 | 11/1960 | Cowlin | 259/3 |
| 3,160,395 | 12/1964 | Reising | 259/3 |
| 3,442,495 | 5/1969 | Schreiber | 261/92 |
| 3,488,037 | 1/1970 | Prochazka | 259/4 |
| 3,502,304 | 3/1970 | Pfrengle | 259/3 |
| 3,588,052 | 6/1971 | Scholtz | 259/3 |
| 3,614,071 | 10/1971 | Brock | 259/3 |

*Primary Examiner*—Harvey C. Hornsby
*Assistant Examiner*—James A. Niegowski

[57] ABSTRACT

A pipeline is provided through which gases and liquids flow. The pipeline contains relatively hard unattached objects. The line is rotated causing the solid objects to bounce and tumble within the line contacting the interior of the line. As the balls bounce and tumble they agitate the liquid passing through the line and inhibit it from assuming a dry state. The tumbling balls also act to splash and cascade the liquids whereby the gases are scrubbed or cleansed between the entrance and exit ports. The pipeline may be compartmentalized by means of plates which are provided with apertures to permit the gases and liquids to flow from the entrance to the exit parts. The relatively hard unattached objects may be disposed in each compartment.

10 Claims, 7 Drawing Figures

RELATIVELY HARD UNATTACHED OBJECTS TO INHIBIT CAKING AND SCALING IN A HORIZONTAL PIPELINE

BACKGROUND OF THE INVENTION

There had been a long-standing problem concerning atmospheric pollution caused by emission of sulphur dioxide from industrial plants, such as power plants and metallurgical smelters.

Recently an important development was made which involved the use of relatively solid means which tumble or bounce to prevent the adherence of particulate matter on a confined line. The relatively solid means of that development function to prevent the liquid passing through the line from assuming a dry or precipitate state as it is splashed or otherwise distributed about the entire periphery of the line. The action of the tumbling means also provides complete contact between the gas and liquid flowing through the line to achieve the appropriate chemical reaction therebetween for cleansing of the gases. The tumbling means cause the gases to flow in a tortuous path through the confined line.

The present invention deals with a specific means to accomplish a similar result, namely, in the form of relatively hard objects which are not attached to each other and which bounce and tumble within the line to attain a result similar to that described above.

BRIEF STATEMENT OF THE INVENTION

The present invention utilizes a substantially horizontal line which is provided with a group of relatively hard objects. As the gases and liquids are passed through the line, the line is rotated, causing the objects to bounce and tumble around the interior of the line. This causes an inhibition of caking or scaling of the liquid media and causes the liquid to be cascaded into the path of the noxious gases to clean or scrub the gases between the entrance and exit ports.

The pipeline may be lined with a resilient material such as rubber to assist the tumbling and bouncing action. Furthermore the objects themselves may be coated with a resilient material for the same purpose.

The pipeline may be divided into compartments by plates having apertures therein with each compartment containing the relatively hard unattached objects.

In the form of compartmentalization shown, the plates are secured to horizontally extended cross-bars and form a cage which is secured within the pipeline. As the cage and the pipeline rotate, the balls, as aforesaid, bounce and tumble within the line.

DETAILED DESCRIPTION OF THE INVENTION

To facilitate an understanding of the invention as set forth in one embodiment thereof, reference is made to the following description and the illustrative drawings, in which.

Figure 1:
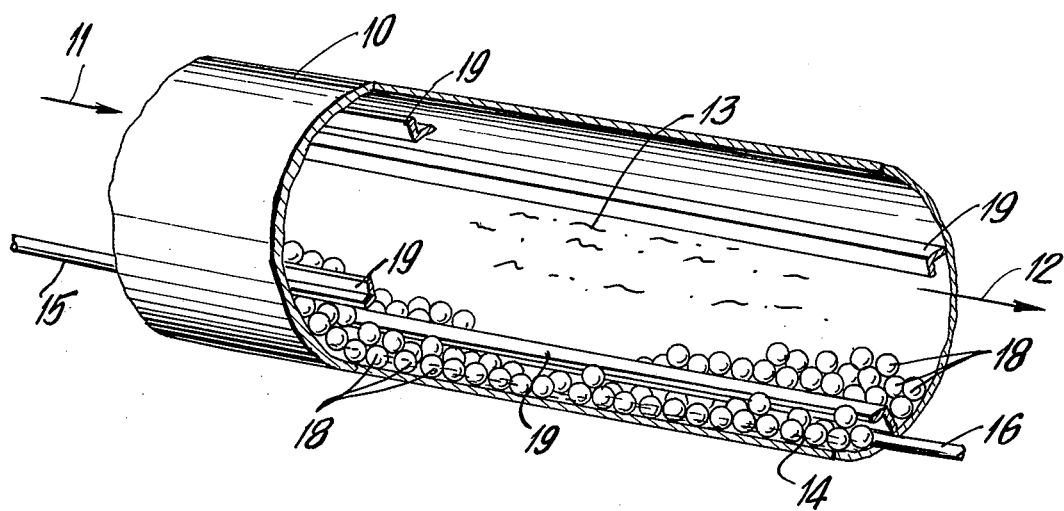
FIG. 1 is an isometric view of the pipeline containing the relatively hard unattached objects.
Figure 2:
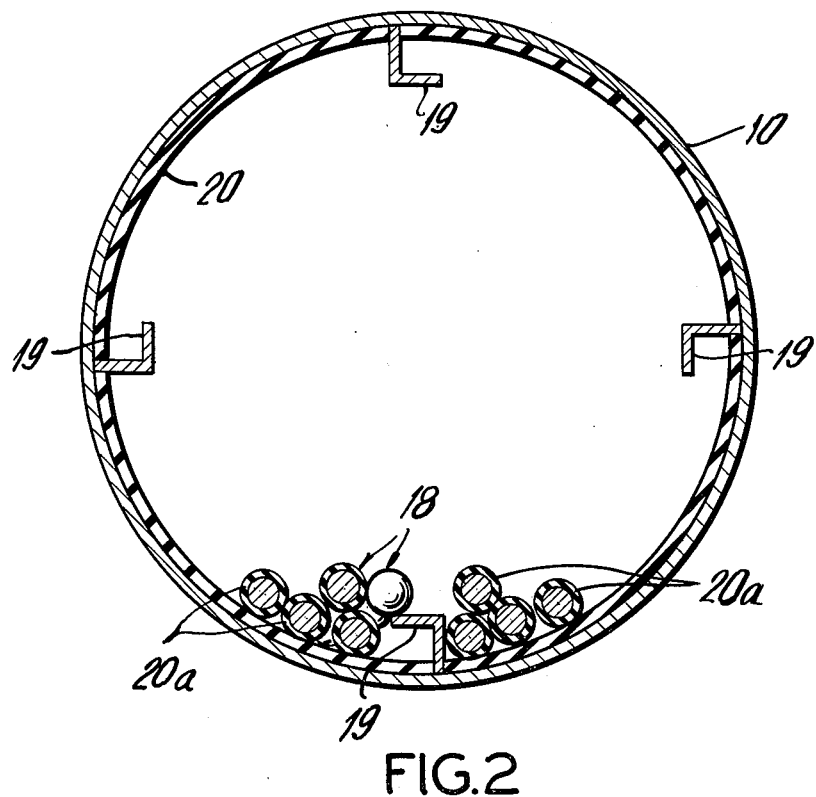
FIG. 2 is an isometric view of the pipeline with lifters and also showing the interior resilient coating and the resilient coating on the objects.

According to the present invention as shown in FIGS. 1 and 2 there is provided a pipeline 10 which is disposed on a horizontal plane. The pipeline is located between the entrance 11 and the exit 12 for noxious gases 13, such as $SO_2$ which pass through the line. An aqueous cleaning solution 14, which is preferably a slurry of lime, passes through the line from the entry port 15 to the exit port 16. As both of these fluids, viz; the gases and the liquid pass through the line is rotated by any suitable drive means such as the motor 17. Carried within the interior of the line is a plurality of unattached relatively hard objects 18. While these objects are shown as balls it will be understood that this showing is merely illustrative and that the objects may comprise any hard objects such as rocks or pebbles and may be of any regular or irregular shape.

As the line is rotated the objects 18 are caused to tumble and bounce within the line. This action causes the aqueous cleansing slurry to splash and cascade within the interior of the line and forms droplets 28 which are introduced into the path of the gases. As this is done, the noxious gases are completely contacted by the cascading liquid to insure the cleansing of the gases. Furthermore, this tumbling action inhibits the aqueous slurry from assuming a dry state but, instead, maintains the liquid in slurry form. As a consequence, caking or scaling of the slurry is prevented.

As shown lifters 19 may be provided, extending lengthwise of the line to carry the hard objects up around the inner periphery of the line. Thus it is not necessary to rotate the line at high speeds in order to carry the hard objects around the entire periphery of the line.

Furthermore as shown in FIG. 2, in order to enhance the bouncing and tumbling action, the pipeline 10 may be lined with a resilient material 20, such as rubber and, if desired, the hard objects themselves may be coated with a resilient material 20a.

The noxious gases passing through the entrance 11 through the exit 12 are scrubbed and when discharged through the exit 12 contain extremely little, if any, air pollutants. The aqueous slurry itself, when discharged at its exit 16, may be recaptured for whatever desired purpose.

In the form of the invention shown in FIGS. 2–7 the pipeline 10 is compartmentalized. Wherever possible in describing the form of the invention the same numerals have been used as those used for the same parts with reference to FIGS. 1 and 2.

For the purpose of compartmentalization the pipeline 10 is provided internally with a cage structure 21. The cage is constructed of horizontal cross-bars 22 which extend between the end rings 23 and 24. A series of plates 25 having apertures 26 are secured to the inner sides of the horizontal cross-bars 22 at varous points as shown. The plates 25, which are disposed on a plane substantially normal to the axis of the pipeline, serve to provide compartments 27 within the interior of the pipeline 10. A plurality of unattached relatively hard objects 18 are disposed in each compartment and are prevented by the plates from passing along the horizontal pipeline 10. The cage structure 21 is inserted into and secured within the pipeline by suitable attachment of the end rings 23 and 24 to the pipeline. The objects 18 are inserted in each compartment 27 through the doors 29 provided on the exterior of the pipeline which may be opened to permit the balls to be placed into the compartments. While three plates forming two compartments are illustrated, it will be understood, of course, that additional plates to form additional compartments may be provided. The entire pipeline and the cage contained therein are rotatable, being driven by motor 17.

Figure 3:
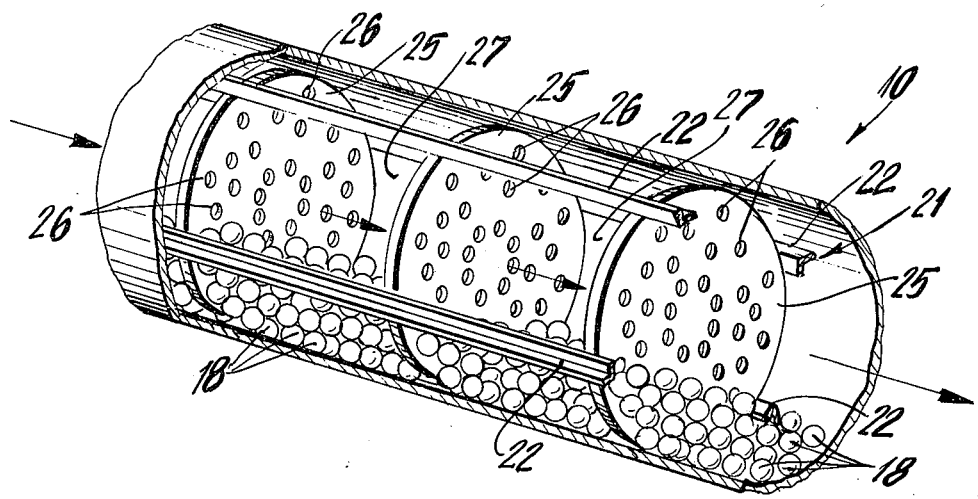
FIG. 3 is an isometric view of the pipeline showing compartmentalization of the line with the compartments containing the unattached objects.
Figure 4:
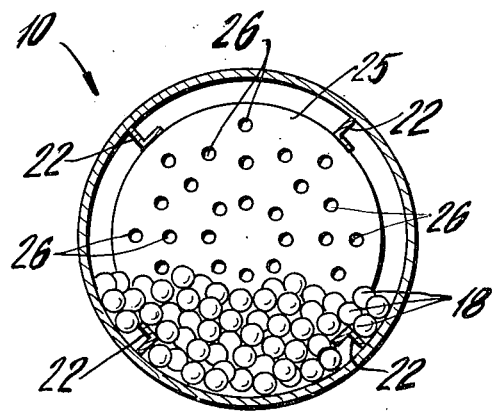
FIG. 4 is an end view of the cage within the pipeline showing the tumbling media in static form.
Figure 5:
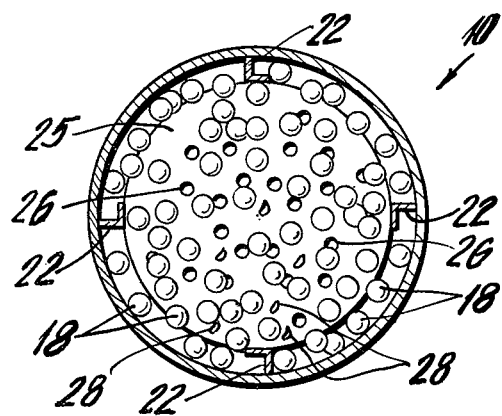
FIG. 5 is an end view of the pipeline showing the tumbling media in an active position during rotation of the pipeline.
Figure 6:
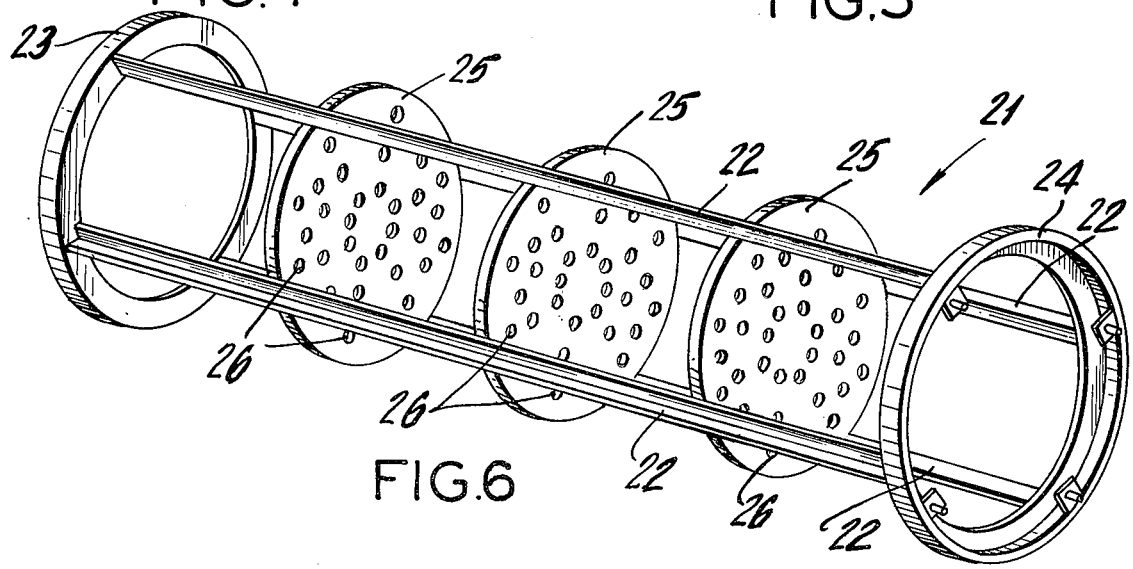
FIG. 6 is an isometric view of the cage structure.
Figure 7:
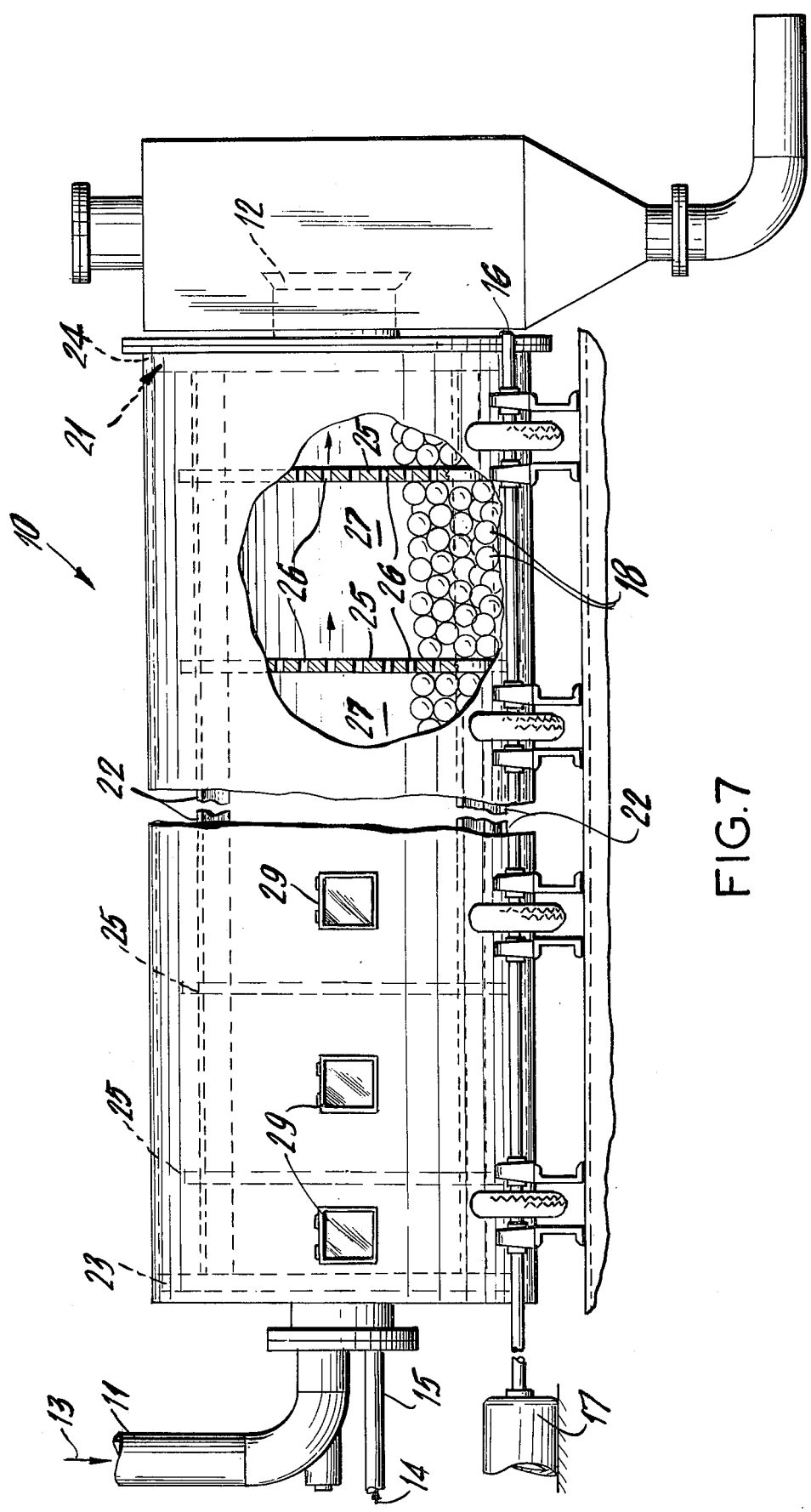
FIG. 7 is a side view of the pipeline partially broken away to expose a compartment containing the tumbling media.

The horizontal pipeline 10 is located between the entrance 11 and exit 12 for noxious gases 13, such as $SO_2$ which pass through the line. An aqueous cleaning slurry 14, which is preferably a slurry of lime, passes through the line from the entry port 15 to the exit port 16. The gases flow from compartment to compartment through the apertures 26. As both of these fluids, viz., the gases and the liquid, pass through the lime the line is rotated causing the objects 18 to tumble and bounce within the compartments in the line, as shown in FIG. 3. This action causes the aqueous cleansing slurry to splash and cascade within the interior of the line and forms droplets 28 which are introduced into the path of the gases. The objects are maintained in their separate compartments by the plates during this operation. As this is done, the cascading liquid completely contacts the noxious gases to insure the cleansing of the gases. Furthermore, this tumbling action maintains the liquid in slurry form. As a consequence, caking or scaling of the slurry is prevented.

As aforesaid, the noxious gases passing from the entrance 11 to the exit 12 are scrubbed and when discharged contain extremely little, if any, air pollutants. The aqueous slurry itself, when discharged at its exit 16 may be recaptured for whatever desired purpose.

Thus, the present invention provides a specific means for inhibiting caking or scaling of the cleansing slurry within the pipeline while, nevertheless, achieving highly successful scrubbing of the gases.

While the invention has been described in some detail, it is to be understood that variations and modifications may be made without departing from the spirit set forth, as set forth in the appended claims.

What is claimed is:

1. Apparatus for inhibiting the adherence of particulate matter in a substantially horizontal pipeline having inlet and outlet ports comprising:
   a plurality of relatively hard unattached bounceable objects disposed within the line between the inlet and the outlet ports,
   means for introducing noxious gases and cleansing liquids into the line for intermixing to cleanse the gases before emission at the outlet ports,
   means for rotating the line to cause the objects to tumble and bounce in the liquid within the line to distribute the same in the path of the gases and to inhibit the adherence of particulate matter on the interior surface of the line, and
   spaced apart plate means carried in said line for maintaining said objects in selective axial distribution along said line to avoid substantial axial travel of said objects and uneven accumulation thereof within the line during rotation of the line.

2. The invention as defined in claim 1 in which the objects are balls.

3. The invention as defined in claim 1 comprising, in addition, a resilient lining on the interior of the pipeline.

4. The invention as defined in claim 1, comprising, in addition, a resilient coating on said solid objects.

5. The invention as defined in claim 1 including lifting means secured to the interior of said pipeline and extending lengthwise of said pipeline.

6. The invention as defined in claim 1, comprising, in addition, a plurality of plates disposed, within the line substantially normal to its axis of the line to form compartments within which the balls are located.

7. The invention as defined in claim 6, in which the plates are provided with apertures to permit the flow of gases along the pipeline.

8. The invention as defined in claim 7, comprising, in addition, doors in the pipeline through which the relatively hard balls may be introduced into the compartments in the line.

9. The invention as defined in claim 1, comprising, in addition, a cage formed of bars and plates secured substantially normal to said bars, said plates being provided with apertures to permit the flow of gases through said line, said cage being secured to the pipeline.

10. Apparatus for inhibiting the adherence of particulate matter in a substantially horizontal pipeline having inlet and outlet ports, comprising:
   a rotatable interior surface provided in the line which surface is substantially non-displaceable radially out of its normal planar disposition,
   means for introducing noxious gases and cleansing liquids into the line for intermixing to cleanse the gases before emission at the outlet ports,
   apertured plates secured to the interior of the pipeline and substantially normal to the pipeline to form the line into a series of compartments,
   relatively hard bounceable balls unattached to each other disposed freely within the compartments and in mechanical contact with the interior surface of the line,
   doors in the pipeline in communication with each compartment for the introduction of the relatively hard balls into the pipeline, and
   means for rotating the interior surface of the line and the compartment to cause the balls to tumble and bounce in the liquid within the line to distribute the same in the path of the gases and to inhibit the adherence of particulate matter on the interior surface of the line.

* * * * *